United States Patent [19]

Townsley

[11] Patent Number: 5,285,825
[45] Date of Patent: Feb. 15, 1994

[54] METHOD AND APPARATUS FOR FILLING CONTAINERS

[75] Inventor: Robert C. Townsley, Bonnybridge, Great Britain

[73] Assignee: A.G. (Patents) Limited, London, England

[21] Appl. No.: 776,333

[22] PCT Filed: Jun. 11, 1990

[86] PCT No.: PCT/GB90/00900
§ 371 Date: Feb. 10, 1992
§ 102(e) Date: Feb. 10, 1992

[87] PCT Pub. No.: WO90/15755
PCT Pub. Date: Dec. 27, 1990

[30] Foreign Application Priority Data

Jun. 12, 1989 [GB] United Kingdom ............ 8913434

[51] Int. Cl.$^5$ ............................................. B65B 3/04
[52] U.S. Cl. ............................................. 141/9; 141/83; 141/104; 141/105
[58] Field of Search ........................ 141/1, 9, 83, 104, 105

[56] References Cited

U.S. PATENT DOCUMENTS

| | | |
|---|---|---|
| 2,925,835 | 2/1960 | Mojonnier . |
| 3,990,212 | 11/1976 | Flodin ............................ 141/83 X |
| 4,469,146 | 9/1984 | Campbell et al. ................. 141/9 |
| 4,494,582 | 1/1985 | Meyer .............................. 141/9 |
| 4,635,689 | 1/1987 | Graffin ............................ 141/1 |
| 4,676,282 | 6/1987 | Bellini et al. .................... 141/1 |
| 4,696,329 | 9/1987 | Izzi ................................. 141/1 |
| 4,913,198 | 4/1990 | Hayahara et al. ............... 141/83 |
| 5,156,193 | 10/1992 | Baruffato ........................ 141/1 |

FOREIGN PATENT DOCUMENTS 0298407 1/1989 European Pat. Off. .
2504650 10/1982 France .

*Primary Examiner*—Ernest G. Cusick
*Attorney, Agent, or Firm*—Charles E. Baxley

[57] ABSTRACT

An improved method and related apparatus for filling a plurality of containers more accurately with a predetermined net weight or volume of fluid by filling means located at a filling station on a line. The weights are determined upstream of the filling station. The containers are filled according to a set point, then the containers are moved to a gross weighing station where they are weighted full and tare weight is deducted therefrom. Corrections based on net values of tare weight and gross weight are applied to the set point of the filling means. The specific gravity of the fluid is input to processing means to allow the net volume of the contents of the containers to be calculated.

25 Claims, 5 Drawing Sheets

METHOD AND APPARATUS FOR FILLING CONTAINERS

BACKGROUND OF THE INVENTION

The present invention relates generally to a method of and apparatus for filling a succession of containers. It is particularly, but not exclusively, of application in filling kegs on a keg filling line.

In the brewing industry, kegs are usually filled with beer or lager using a piece of equipment commonly called a racker. Empty kegs are positioned successively at one end of the racker and pass sequentially through a series of stations or heads where different operations are performed on the kegs. Typically the kegs pass through a plurality of cleaning heads and a steam sterilizing head before they arrive at a filling head where the kegs are filled. Movement of the kegs between the heads is usually by means of a walking beam conveyor. After filling, the kegs move to a discharge platform where they are removed from the machine.

Obviously it is important that each keg is filled with the correct amount of beer or lager. In fact average contents legislation is likely to lay down that a keg must contain at least 98% of its nominal contents. Over filling, on the other hand, can be very costly to the beer producer in some countries excise duty is payable in respect of the excess beer in kegs which is not payed for by the customer. It is difficult to achieve sufficient accuracy with existing filling arrangements.

Several different filling systems have already been used or have been proposed.

In one system the volume of beer flowing into a keg is measured using a volumetric flowmeter. However, flowmeters per se may not be particularly accurate, and further inaccuracies are introduced into such a system by other components such as pipework and valve closures. This calls for painstaking and frequent recalibration of the apparatus.

In another proposed system, the gross (filled) weight of a keg is measured after filling and the contents calculated by subtracting a nominal tare (empty) weight of the keg from this figure. This approach however is very inaccurate since the weight of kegs having, in theory, the same nominal tare weight may vary by as much as +2 kg, due to non standardized production, damage during use (some kegs may be in use for 25 or more years) and replacement of parts such as the valve mechanism forming part of the keg.

A more recent system has proposed that each keg is weighed individually at the filling head. The empty weight of the keg is first taken and the weighing system then zeroed. The keg is then filled until a predetermined weight, corresponding to the desired weight of the contents is reached. The filling is then stopped.

There are several problems associated with such a system. Firstly, the keg is only at the filling head for a relatively short period of time (typically 60 seconds) during which the keg must be weighed empty and then filled. This does not allow much time for an accurate measurement of the tare weight of the keg. This approach inevitably leads to inaccuracies in the zeroing of the system and thus in the total contents. Secondly, the keg is filled relatively quickly and significant kinetic energy and movement is generated on the weighing device, which leads to inaccurate weight measurement during filling. Thirdly, the weighing device usually employed is a platform floating on tension wires, the weight being calculated from the tension in these wires. In such systems, however, the weighing and filling station is immediately adjacent a preceding steam sterilization station, with the result that the tension wires may be subjected to blasts of high temperature steam. This approach of course adversely affects the accuracy of the weight measurement and thus the contents.

SUMMARY OF THE INVENTION

The present invention seeks to provide a method and apparatus whereby a plurality of containers are more accurately filled and which will be of particular but not exclusive application to keg filling.

According to the first aspect, the invention provides a method of filling a succession of containers moving along a filling line with a predetermined net weight or volume of fluid by filling means located at a filling station on said line, comprising steps of: establishing by means of a control processing means as set point for the filling means which is intended to deliver said predetermined weight or volume; entering into the control processing means tare weight data values in respect of the containers; successively moving said containers along said line to the filling station where they are filled by said filling means in accordance with said set point; successively moving said containers to a gross weighing station where they are weight full, and for each of said containers entering into the processing means a value representative of the gross weight of that particular container; for each of a batch of said containers, determining by said processing means a value representative of the net weight or volume of the contents based on the gross and tare weight values; calculating by said processing means, for said batch of containers, a value representative of average net weight or volume of the contents and, if necessary, applying a correction dependent on such value to the set point of the filling means established by the processing means, characterized by successively weighing a plurality of empty containers at a tare weighing station on said line upstream of the filling station, and for each of said containers storing in said processing means a value representative of the tare weight of that particular container, such values being output from a weighing means at said station; determining automatically, by means of said processing means and for such respective container, which stored tare weight value corresponds to each respective gross weight value so entered into the processing means, whereby the value representative of net weight or volume of the contents is calculated on the basis of the tare weight of each individual container; and the processing means operates to apply said correction if the average net weight or volume of the contents for said batch of containers differs from the said predetermined net weight or volume by more than a given amount.

According to a second aspect the invention provides apparatus for filling a succession of containers moving along a filling line with a predetermined net weight or volume of fluid, comprising: filling means located at a filling station on said line; control processing means for establishing a set point for said filling means intended to deliver said predetermined weight or volume; means upstream of said filling station for inputting tare weight data values to said control processing means; means for successively moving said containers along said line to a gross weighing station through the filling station at which said containers are filled in accordance with the set point of said filling means; means at said gross weighing station for weighing said containers full and for providing an output value indicative of the gross weight of a particular container for input to said processing means; said processing means determining for each of a batch of containers a value representative of the net weight or volume of the contents based on the gross and tare weight values and calculating for said batch of containers a value representative of the average net weight or volume of the contents and if necessary applying a correction dependent on such value to the set point of the filling means; characterized in that said means upstream of said filling station comprises weight means for successively weight said containers individually; in that for each container such processing means stores a value representative of the tare weight of that container, determines automatically for each respective container which stored tare weight value corresponds to each respective gross weight value entered thereinto and calculates a value representative of the net weight or volume of the contents based on the tare weight of each individual container; and in that the processing means operates to apply said correction if the average net weight or volume of the contents for said batch of containers differs from the said predetermined net weight or volume by more than a given amount.

The invention may thus closely regulate the contents of a succession of containers by calculating a running average of the net weight or volume of the contents of a batch of containers and comparing this with a desired weight or volume. If it is found to lie outside a predetermined tolerance, the set point of the filling means is corrected.

The new set point will normally remain effective until the average weight or volume of a subsequent batch of containers moves outside the permitted tolerance limits, at which time a new set point will be calculated and set.

By performing empty (tare) weighing, filling, and full (gross) weighing at separate positions, the invention overcomes the problems which arise with prior art filling systems as mentioned above. Containers can be given sufficient time at the respective weighing stations to allow their weights to be measured accurately and the filling process does not introduce any errors into the weighing processes. Furthermore, by weighing each container empty each time it is filled, an accurate tare value is recorded for each individual. container. This approach is especially important because in the field of keg filling, for example, nominal tare weights which may have been recorded on the containers at the time of manufacture will not usually be accurate due to damage and repair in use, or if residual fluid remains in the container prior to filling.

Preferably the invention is applied to filling containers with a predetermined volume of fluid, in which case the specific gravity of the fluid being used should be known in order to allow calculation of the volume from the difference in gross and tare weight values of the containers. When a liquid is being used which has a well established and non-varying specific gravity, then the apparatus may be set up to use only this figure. However, the apparatus is preferably adapted so as to allow either manual or automatic input of the specific gravity of the liquid. This approach allows the system to be used with a number of different liquids, or with a liquid whose specific gravity varies with time.

Preferably the containers are filled through a volumetric flowmeter and preferably the filling is controlled by applying a pulsed electrical signal to a solenoid valve on the output side of the meter. The meter may be of the "Magflo" type. By increasing the pulse count to the valve, it will remain open for longer. Thus, the volumetric correction which is calculated from variation of the average calculated contents from the nominal contents is applied by varying the pulse count to the valve.

The tare weight and gross weight values of the container may be fed to a central control processor which calculates the volume of the container contents, the average volume of a batch and the correction which must be applied to bring the volume back within acceptable limits. The processor may also where appropriate monitor the pulses supplied to the solenoid valve.

It should be noted in this respect that the number of containers in a measuring batch is chosen merely so as to give a representative sample for the purposes of calculating an average contents value, and it may of course be varied. A batch size of 10 has been found to be convenient. The containers in a batch may be successive containers or ones chosen in any convenient manner e.g. every other one.

The tare and/or gross weight measurement may be performed by load cells providing output valves to the control processor indicative of container weight. These allow a high level of accuracy to be achieved, typically to wi 0.02%.

The load cells may be mounted on platforms which isolate them from other parts of the apparatus through for example springs and dampers. Where a system for filling kegs, for example, includes a walking beam conveyor at least the load cells for measuring the tare weight can be carried by the beam, so that the kegs are weighed on the move as they pass through said first position.

In a particularly advantageous embodiment, the operation of the processing means is such that the stored tare weight values of the containers move sequentially through a shift register, in synchronism with the movement of the containers along the filling line, whereby for each container at the gross weighing station the corresponding tare weight value is always at a predetermined position in said shift register and can thereby be determined for comparison with the respective gross weight or volume value. For example the tare weight value of a first container standing at the tare weighting position is initially entered in a first register. Movement of the first container to its next position and movement of a second container to replace it in the tare position causes the tare weight value of the first container to be shifted to a second register and the tare weighing valve of the second container to be entered in the first register. Movement of the first container to its next position and its replacement by the second container, and the movement of a third container onto the tare weighing position causes the tare weight value of the first container to move to a third register, that of the second container to the second register and the tare weight value of the third container to be entered in the first register. This process continues, with the tare weight values moving up the registers until the first container reaches its gross weighing position when the tare value moved into a final tare register. The gross weight value is entered in a separate register and the net weight of the container contents calculated by subtracting the tare value held in the final; tare register from the gross value in the gross register. Thus, for each gross weight value entered, the corresponding tare weight value is always that stored in the final tare register at that time.

A shift register is a particularly simple way of tracking the movement of individual containers through the apparatus and determining which tare weight value corresponds to each gross weight value, although other methods, for example timing, could be used. A particular advantage of a shift register processing means is that it is immune to gaps in the line as these will provide no stored tare weight value and no corresponding gross weight value and can simply be ignored in the calculation. The correlation between subsequent tare and gross weight values is not affected. This correlation is important in the brewing industry, where gaps in the keg filling line often arise.

Also, the system may have means for identifying and rejecting containers which have unacceptable tare weight values. When such a container is detected, the processing means ignores it for the purposes of calculating average contents so that it does not adversely affect the calculation.

Furthermore the calculated net content weight or volume for each container may be compared with a minimum or maximum permissible value, and if it lies outside an acceptable range it is again ignored for the purposes of calculating the average volume of the batch and, if required (for example if it is below a predetermined minimum), rejected. The system preferably rejects the unsatisfactory containers downstream of the gross weighing position using suitable means. Thus in containers are detected and rejected by virtue of the tare and gross measurements taken and not by virtue of a checkweigher as is common in the prior art.

It is common in prior art keg filling apparatus, for example, to have a plurality of filling lines arranged side by side, the lines receiving empty containers from a common supply conveyor and discharging filled containers, in a batchwise manner onto a common discharge conveyor. A checkweigher is situated in the discharge conveyor to weigh individual containers or kegs as they pass and to remove from the discharge conveyor those which are under weight.

The gross and tare system of the present invention may be applied to the individual lanes of such apparatus and may also provide an integrated control for discharging from the discharge conveyor containers which have been labelled as 'reject' in the individual lanes. Such a system can easily be applied retrospectively to existing equipment, and may obviate the need for a separate 'reject' conveyor for receiving reject containers directly from the filling lanes.

In a preferred embodiment of the invention, therefore, a number of filling lines lead to a discharge conveyer which receives containers in batches from discharge stations at the end of each line, processing means being arranged to identify, for each batch to be discharged, which of the discharge stations has a container thereon and thereby calculate the total number of containers in the respective batch, the processing means also receiving signals to identify the positions of any containers in each batch which are to be rejected as determined by the aforesaid tare and gross weight measurement steps, and means for counting the containers of each batch passing along the discharge conveyor and for means removing the reject one's.

Such a system may be immune to changes in batch size which is important in the brewing industry, for example, where there may frequently be gaps in the lines or empty lines.

The control system identifies which lanes will be discharging containers, and of those, which containers have been identified as being reject. Preferably, a code representative of the batch configuration and the position of rejects within the batch is established for each batch, the counting and removing means on the discharge conveyor being responsive to such code.

The configuration of the batch may be checked before and/or while it passes through the rejection device and if any errors found, e.g. the total number counted as passing through the discharge line exceeds the number of containers in the batch as previously determined by the processing means, the batch regarded as corrupt and the rejecting device operated in response to a checkweigher for that batch. Once a corrupt batch has passed, the rejection device is returned to the control of the tare and gross system.

The number of containers in a batch may be checked by means of photocells arranged between the area of the conveyor onto which the containers are discharged from the filling lines and the rejection device, and if the incorrect number is found, the batch labelled as corrupt.

As a further check, the checkweigher may in normal operation continue to weigh containers as they pass and compare the weight with a given minimum value. If the container is below this value, but the tare and gross processor indicates that it is not to be rejected, (as might happen if an empty container was added to the batch before it reached the checkweigher) then the batch will be labelled as corrupt.

BRIEF DESCRIPTION OF THE DRAWINGS

A preferred embodiment of the invention will now be described by way of example only, with reference to the drawings in which.

DESCRIPTION OF THE PREFERRED EMBODIMENT

Figure 1:
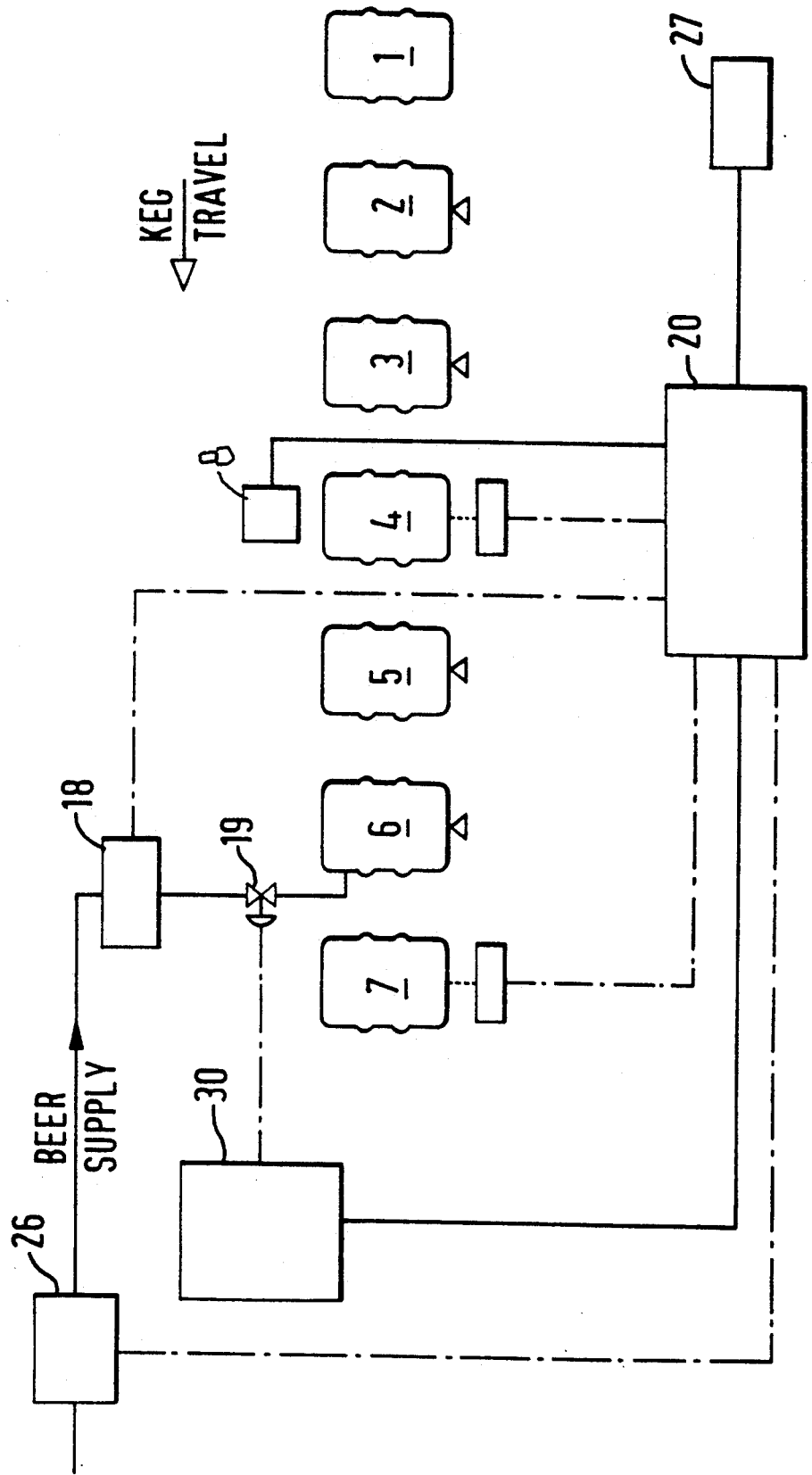
FIG. 1 shows schematically a line for filling beer and the like kegs which embodies the invention.
Figure 2:
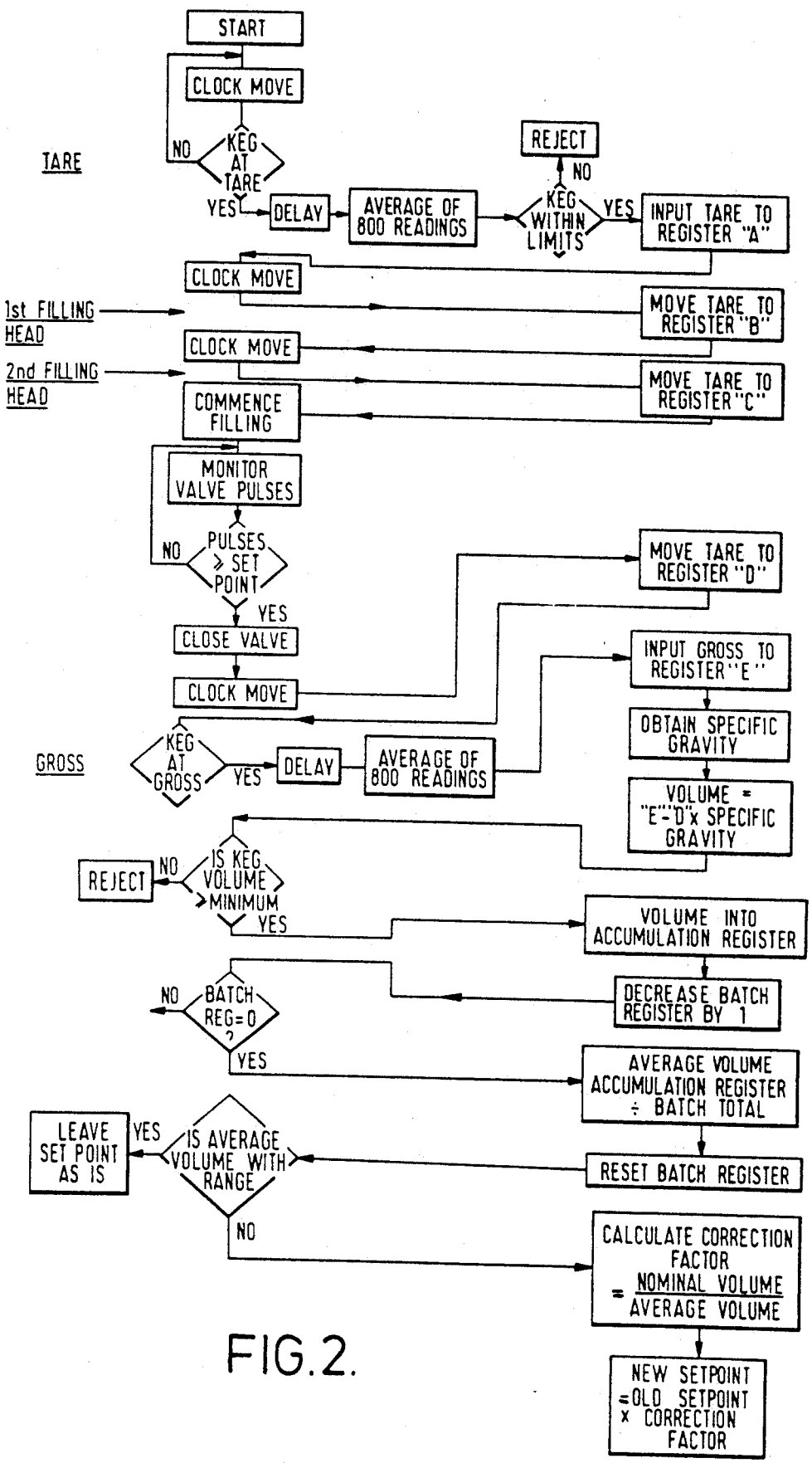
FIG. 2 is a flow diagram showing the operations performed on a keg at each station and the calculations performed.
Figure 4:
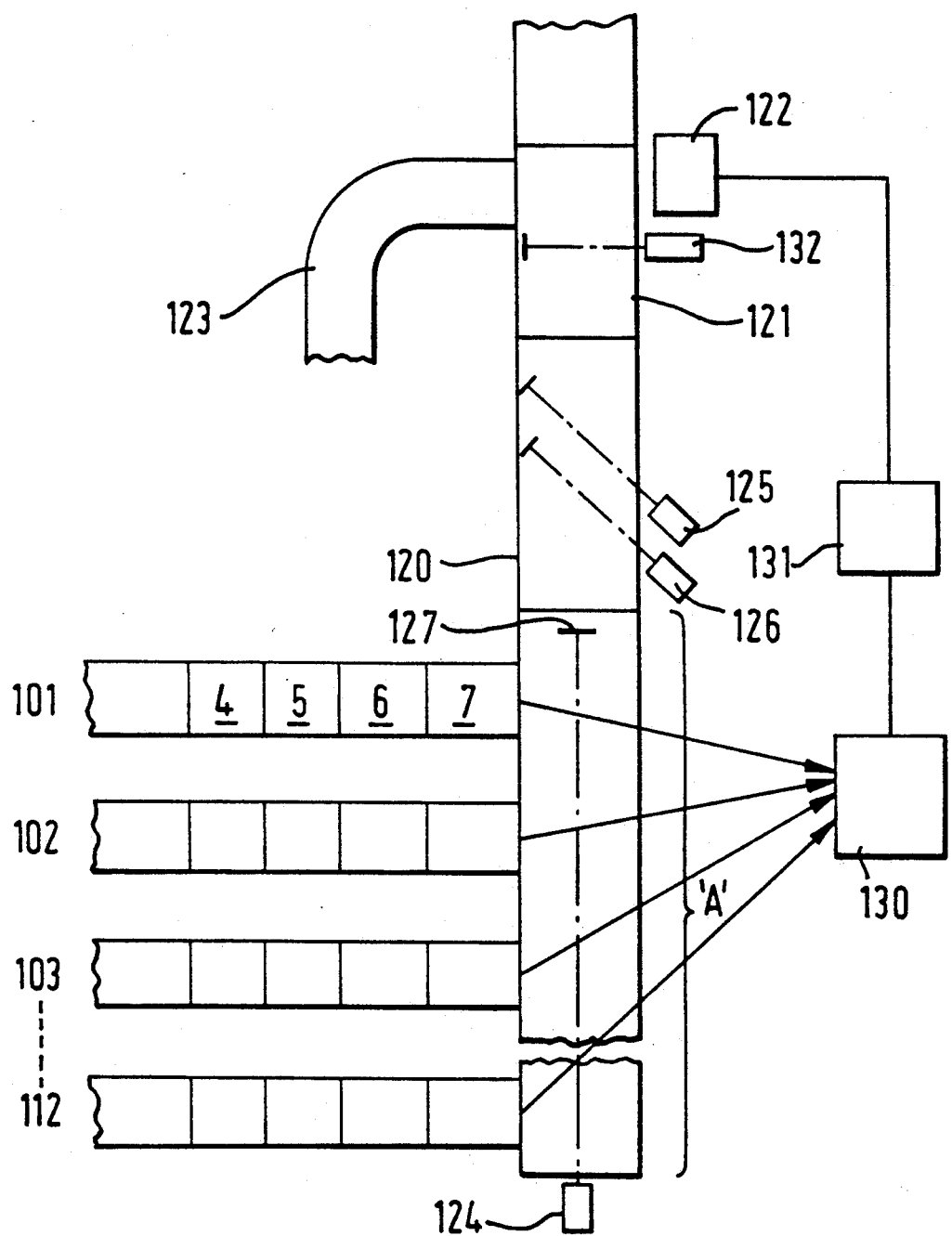
FIG. 4 shows, schematically a multi-lane keg racker.

With reference now to FIG. 1, the invention is shown schematically applied to a keg racker. As can be seen in FIG. 4, it is usual to have several lines discharging onto a common conveyor, but for simplicity, only a single line arrangement will be described first.

Kegs move sequentially through a succession of stations 1–7 at which they are subjected to a variety of operations. In this example, station 1 is the infeed, stations 2 and 3 are cleaning and sterilizing stations, station 4 is the tare weighing platform, station 5 a first filling head, station 6 a second filling head and station 7 is the gross weighing platform. The kegs are moved successively between the stations by means of a reciprocating walking beam 9 which runs the length of the racker as is well known in the art and which need not therefore be described in detail here. The kegs are discharged from the gross station 7 onto a conveyor not shown.

Figure 3:
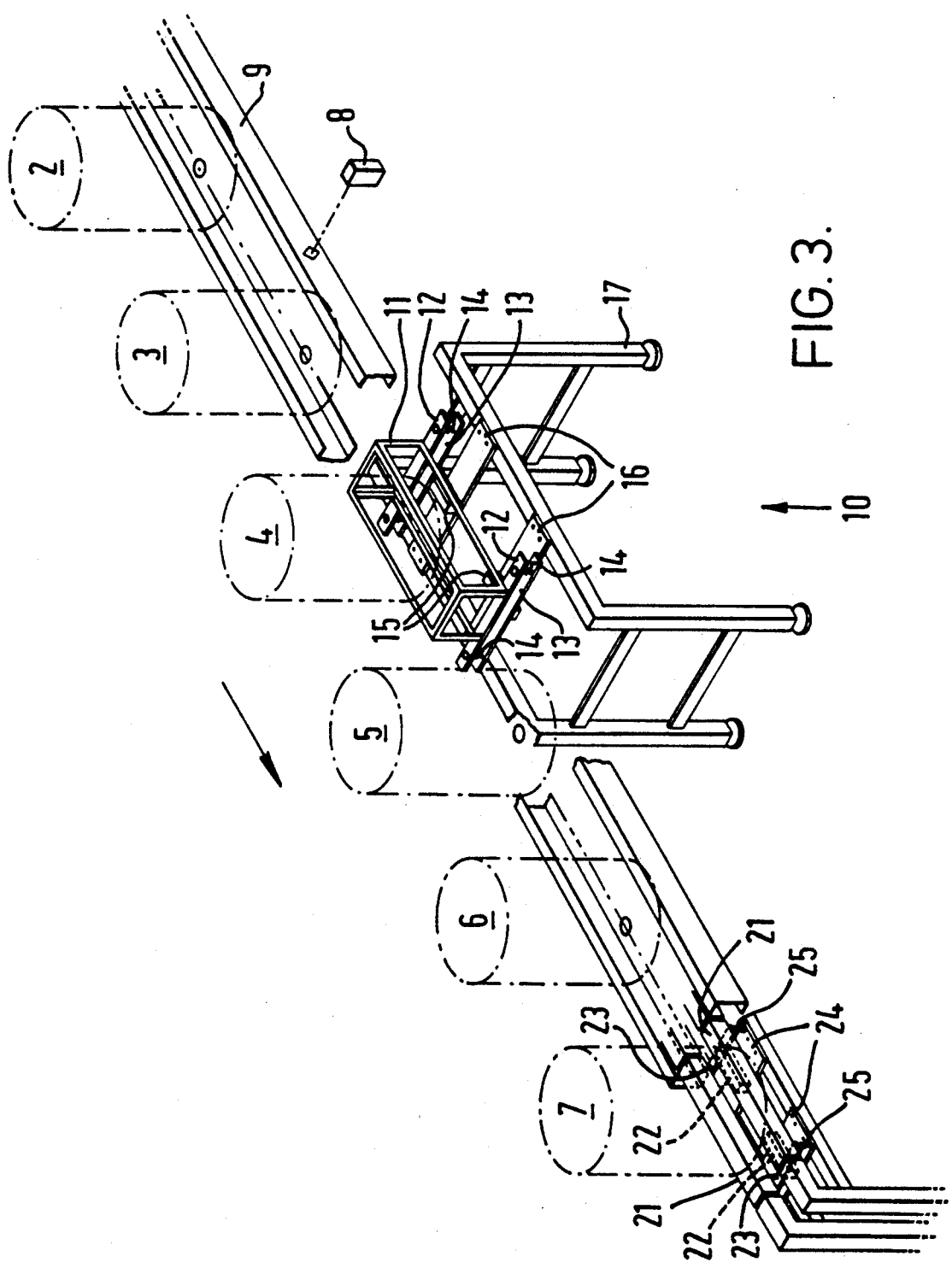
FIG. 3 shows the construction of the gross and tare weighing platforms in more detail.

After passing through the stations 2 and 3, a keg is deposited on the tare platform 10 at the weighing station 5 (FIG. 3). Sterilization is achieved by the ingress of steam (105° C.) at station 3 and continues while the keg is on the tare weighing station 4. The steam is evacuated when the keg reaches the first filling head. The platform comprises a frame 11 for supporting the keg, the frame 11 being mounted on upper cross members 12. The upper cross members 12 are mounted on lower cross members 13 through dampers 14. The lower cross members 13 bear an load cells 15 which are mounted on cross beams 16 of a base frame 17. The dampers 14 cushion the load cells 15 from potentially damaging shock loadings that may occur when the keg is initially lowered onto the upper frame 11. Overload stops (not shown) are also provided. The base frame 7 is in this embodiment separate from the fixed frame (not shown) of the keg racker which runs lengthwise of the machine between the limbs of the walking beam and which supports the kegs at other stations such as the filling head 6. This arrangement isolates the platform from any vibration coming from the main machine. Of course the upper frame could alternatively be mounted on the racker frame through suitable isolating means such as springs and dampers, or the effects of vibration could be filtered out electronically.

The movement of the keg onto the tare platform 11 is clocked by a photoelectric cell 8 which is conveniently activated by the beam 9 as it lifts the keg and then moves it forward on to the tare platform. After placing the keg, the beam returns to its low level and moves backwards to its original position. The keg will remain on the weighing platform for typically 50-60 seconds. In this time, a large number of weight readings (typically 800) may be taken by the load cells 15 so that a very accurate average tare weight reading may be established. The weight readings are made after a time delay, so as to allow the load cells to settle after the keg has been dropped onto the platform. Readings are usually taken over a period of at least 20 seconds. The use of load cells allows a very accurate measurement to be taken. Typically the load cell accuracy is better than 0.02%. The average tare weight may at this point be compared with a nominal tare weight to check that the correct size of keg is being used. If it is incorrect, then it will not be filled when it reaches the filling station and its tare weight will not be used in the calculation of the set point for the filling head. It will also be subsequently rejected from the line. Assuming that the correct keg size has been identified, the tare weight value of the keg is entered into register A of a shift register of the control processor having a series of registers A to E and the keg is then moved from the tare platform 11 by the walking beam 9 to the next station 5, the first filling head. This move is clocked by the photocell 8 as the next keg moves onto the tare platform 11. As the move is clocked, the tare weight value of the first keg is moved to a register B of the shift register to make room for the entry of the tare weight value of the next keg into the register A.

At the first filling head 5 the keg is initially pressurized with $CO_2$ to allow filling with product at the second filling head 6 against an internal back pressure, as is desirable. The move of the first keg from the first head 5 to the second head 6 is clocked by the movement of a third keg on to the tare platform 11, and the tare weight value of the first keg is now moved up to register C and the tare weight value of the second keg into the register B.

At the second filling head the keg is filled with beer or lager through a volumetric "Magflo" flowmeter 18 and a solenoid closing valve 19. The quantity of beer or lager added is determined by the opening and closing of the solenoid valve 19 which is controlled by the processor 20, through the racker control panel 30. Electrical pulses are applied to the valve by the processor which also monitors the number of pulses applied and compares that with a "set point". The set point is the number of pulses calculated, in a manner to be described later, required to give the correct volume of filling. The set point will remain effective for a given number of kegs. When the number of pulses applied equals the set point the valve is closed and filling stops. There is a delay between the pulses stopping and the filling stopping while the valve shuts. This delay is determined experimentally and assumed to be constant during a production run and the set point is set so as to accommodate this delay. An orifice valve may be placed in series with the solenoid valve 19 and arranged to operate at a given number of pulses before the set point, to cause the flow rate through the valve 19 to fall prior to its closing. This approach improves accuracy. The number of pulses taken is recorded for each keg and averaged out over a batch. When the average volume per keg has been calculated as will be described later, this may be used to calculate a figure for the average number of liters delivered per pulse.

After filling, the first keg moves on to the gross platform 11, with the other kegs being moved onto their respective next stations. The tare weight value of the first keg is moved up into register D and the tare weight values of the following kegs moved into their respective next registers up.

The gross platform 7 comprises a pair of rails 21 which are aligned with but separate from the fixed frame of the racker, and upon which the keg rests. The rails 21 act on load cells 22 through upper cross members 23.

The load cells 22 rest on plates 24 which are fixed to the frame of the machine. Stops 25 prevent overloading of the load cells 22 when the keg is dropped onto the rails 21.

After a time delay of typically 15-20 second, a series of weight readings (typically 800) is taken and an average gross weight calculated. The gross weight value of the keg is now input to register E, and the weight of the keg contents calculated by subtracting the value in register D from that in register E. By using a shift register system, no matter which keg is at the gross platform, its contents weight can always be obtained in this manner, as the tare weight value of any given keg moves up through the registers as the keg moves successively through the stations.

When the gross weight has been taken, the keg is removed from the platform by a pivoting arm arrangement onto a discharge conveyor; as is conventional in the art.

The calculations performed by the process 20 and the control of the filling equipment thereby will now be described.

As has been said earlier, the filling of a keg is determined by the closing of a solenoid valve 19 which is controlled by the processor 20. When the pulses supplied to the valve equal the set point the valve is closed and filling stops after a certain delay. The set point is in this case the number of pulses which are required to keep the valve open sufficiently long to provide the correct volume of content taking account of the closing delay. The set point may be set initially by calibration of the system and will be tuned by feedback during the production run. This approach is necessary as there are several factors which may change during the run and which may affect the volume delivered e.g. changes in supply pressure.

This approach is achieved by the processor 20 calculating the average volume of the contents of a batch of kegs and if this figure lies outside a given tolerance with respect to the desired volume, applying a correction to the set point for the next batch of kegs. It has been found that 10 kegs form a suitable batch size. The set point is thus in effect monitored every ten kegs. The batch size is entered into a batch register which is calculated, and which is reset when ten kegs have been processed. The number of kegs in a batch can be altered merely by changing the maximum value in the batch register.

With reference again to the figures, after the weight of the contents of a keg has been calculated by subtracting the tare value from the gross value, its volume must be calculated. For this, the specific gravity of the beer or lager must be known. This figure may be input to the processor 20 manually from the results of separate testing but it is preferred to provide a specific gravity meter 26 in the supply line to the filling head. This approach allows a constant monitoring of the specific gravity of the beer or lager, and thus not only makes for more accurate volume determination but also may be useful for the purposes of record keeping.

Once the volume of the keg contents has been determined, it is compared with a predetermined minimum acceptable value (for example the legal minimum) and if it exceeds this figure, the batch register is decreased by one and the determined volume will be used in calculating the average contents of the batch and thus in recalibrating the set point. If it does not exceed the minimum value, then the batch register will not be decreased and the calculated volume will be discarded for the purposes of set point calibration. This approach allows for more accurate recalibration. The underweight kegs will also be rejected at an appropriate point, for example by a pneumatically operated arm downstream of the gross platform.

When ten acceptable keg volumes have been determined (i.e. volumes which exceed the predetermined minimum), which is apparent from the batch register decreasing to zero, the batch register is reset to ten and the average volume calculated by dividing the sum of the individual volumes stored in a further accumulation register by the batch size i.e. the maximum value in the batch register, in this case ten. The calculated average keg contents volume is then compared with the desired, nominal keg contents volume and if it lies within a predetermined tolerance range, the set point of the valve 19 will not be changed. However if the volume lies outside the range, a correction will be applied to the set point. This is achieved by dividing the nominal volume by the calculated volume to obtain a correction factor. The existing set point pulse count is then multiplied by the correction factor to establish a new set point pulse count which will remain unchanged over the next batch after which it will either remain unchanged or be updated depending on the calculated average keg contents volume for that batch.

By applying feedback in this manner, the average contents of one batch of kegs is used to recalibrate the filling means such that if necessary a corrected volume of beer or lager will be supplied to a subsequent batch of kegs. This limits any error in contents volume to a small number of kegs.

Various items of data may be down loaded from the processor to a p.c. for display purposes. For example the tare and gross weights and contents volume could be displayed for each keg. Various data, for example specific gravity, keg weights and contents volume could also be downloaded into a commercial spreadsheet software package which would allow statistical analysis of the filling process.

It is normal in keg rackers to provide a plurality of filling lines side by side. FIG. 4 shows, schematically, such a keg racker 100 comprising twelve lanes 101,102,103 . . . 112, only four of which are shown. Each lane has a control system as described with reference to FIG. 1 above and has a tare weighing station 4, first and second filling heads 5,6 and a gross weighing station 7, as described above. Kegs are discharged from the lanes onto a discharge conveyor 120. The movement of kegs along the lanes 101 . . . 112 are synchronized such that if there are kegs at the gross station 7 they will be moved together onto a first zone 'A' of conveyor 120.

The conveyor 120 has a checkweigher 121 and a rejection device 122 which pushes kegs, identified by the control system of the racker as being reject, onto a reject conveyor 123. Acceptable kegs continue along the conveyor for stacking and despatch. In prior art systems the rejection device is controlled by the checkweigher to reject kegs which the checkweigher detects as being underweight. In this embodiment of the invention however, rejects are determined by the tare and gross processors described earlier.

Figure 5:
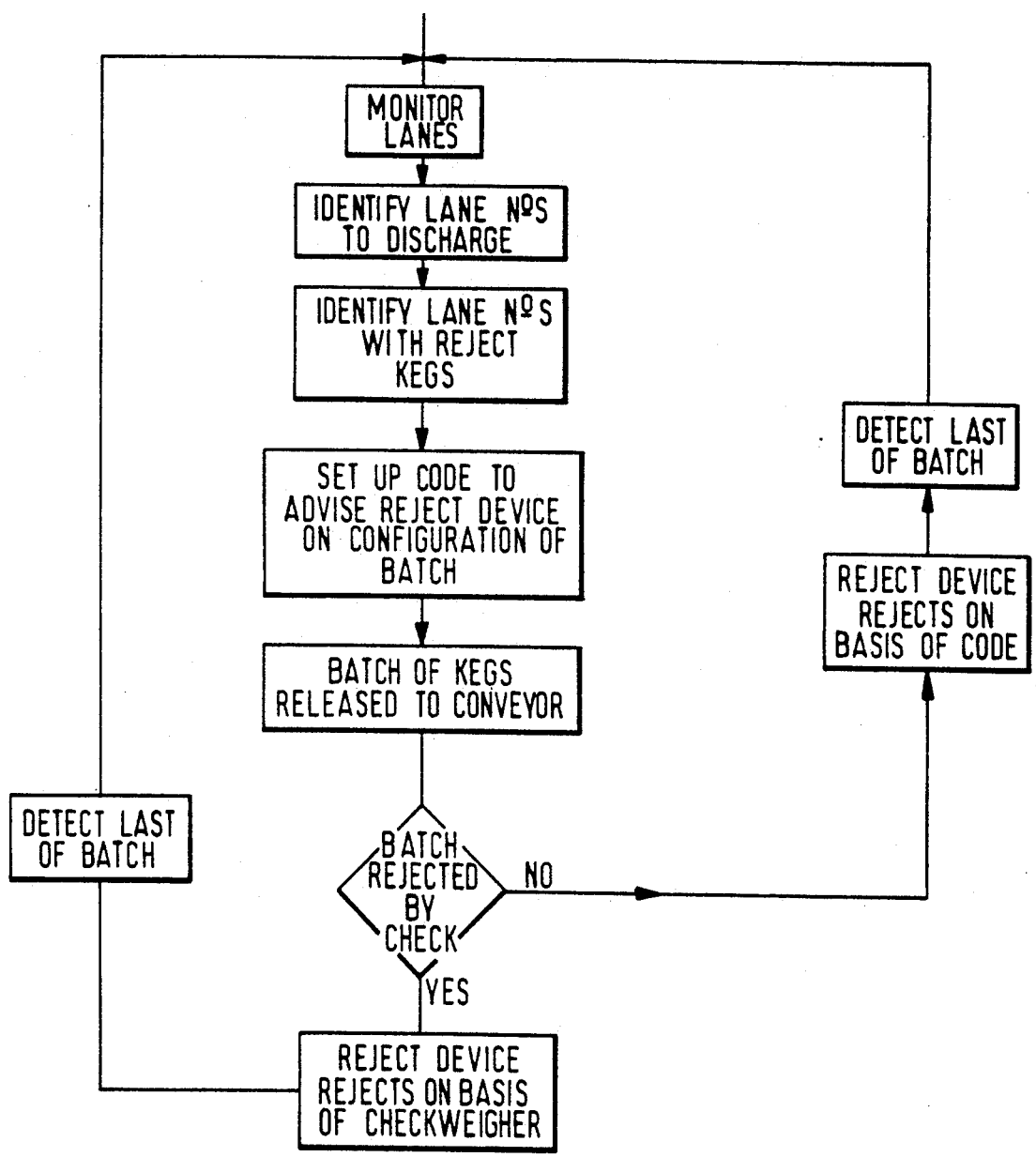
FIG. 5 shows a flow diagram for the keg reject procedure of the racker of FIG. 4.

FIG. 5 shows schematically a flow diagram of the rejection procedure.

In order to control the rejection device to eject the correct kegs, a tare and gross processor 130 monitors zone 'A' of the conveyor and scans the discharge stations of the lanes to identify the number of kegs to be discharged in a batch, and from which lanes. The processor 130 also identifies from the control systems of the individual lanes whether the keg to be discharged is a reject keg, as determined by the criteria described with reference to the earlier embodiments. A precise picture is therefore established by the processor 130 of what size a given batch will be and which position within the batch reject kegs will occupy. This information is then passed to the control device 131 for the checkweigher or rejection device, and which confirms the information has been received. A simple method of recording this information is by means of two hexidecimal binary words the 0's and 1's of the first word denoting respectively the absence or presence of a keg at a respective discharge station and those of the second word representing a satisfactory or reject keg respectively. The rejection device 131 may then establish when to reject a keg by comparison of corresponding digits the binary words as the kegs pass.

Photoelectric cell 132 counts the kegs passing onto the checkweigher 121 so that the rejection device 122 knows which number keg in the batch is at the device at a given time, for the purposes of rejecting unacceptable kegs.

Having established the above information regarding the batch size and configuration, and passed it to the rejection device 131, a batch of kegs is released by the processor 130 from the lanes 100 . . . 112 onto the conveyor 120. A photoelectric cell 124 and reflector 127 act to detect when the conveyor 120 is ready to accept a batch from the lane, since while there are any kegs on the conveyor between the cell and reflector, the beam will be broken and a further batch will not be released on to the conveyor.

Once a batch is released, the kegs move onto the conveyor 120 and move past photoelectric cells 125 and 126. These cells count the batch and confirm that the correct number of kegs is still in the batch and that a number have not been removed or added. If the number of kegs in the batch is found to be incorrect or the beams have been broken in the wrong order, for example by someone putting their hand in front of the beams, the control system will regard the batch as corrupt and will pass control of the rejection device to the checkweigher for that batch. As soon as the corrupt batch has passed the rejection device, the latter returns to the control of the gross and tare processor 130, and the process started again.

The checkweigher in this embodiment may still continue to function, but not to reject kegs except under error conditions, for example as above. The checkweigher may be used as an additional safeguard in that if it detects an underweight keg while the processor 130 indicates that the keg is acceptable, an error signal may be generated which passes the rejection device to the control of the checkweigher for the rest of the batch. This would cover the case for example in which an empty keg was added to the batch and passed through the photocell 132 before the remainder of the batch had passed through the photocells 125,126.

If the cells 125 and 126 detect that the correct number of kegs is in the batch is acceptable, the rejection device will reject those kegs identified as rejects by the gross and tare processor, and when the batch has passed the reject device, the process is started again with a new batch. Indeed a new batch may be discharged on to the conveyor as soon as the batch has passed the cells 125 and 126. Of course further safety features could be introduced in such a system, for example means for detecting movement of a keg from the conveyor 120.

The present invention is especially suitable for retrospective application to existing keg rackers since it does not interfere with the normal operation of the racker or alter the efficiency of the operation.

Although the invention has been described with reference to a keg racker, it will be appreciated that it could equally be applied to any system where a succession of containers must be filled to a predetermined weight or volume.

Various modifications may be envisaged by those of relevant skill. For example, instead of the stationary tare platform, it could be mounted pannier style on the walking beam so that the kegs are weighed on the move as they pass through the weighing station. Also, it is possible to keep a record for any given size of container, for example, the average number of pulses required to fill the container to the correct level. These values may be used as an initial set point when the system is started up.

I claim:

1. A method of filling a succession of containers moving along a filling line with a predetermined net weight or volume of fluid by filling means located at a filling station on said line, comprising steps of: establishing by means of a control processing means a set point for the filling means which is arranged to deliver said predetermined weight or volume; entering into the control processing means tare weight data values in respect of the containers; successively moving said containers along said line to the filling stations where they are filled by said filling means in accordance with said set point; successively moving said containers to a gross weighing station where they are weighed full, and for each of said containers entering into the processing means a value representative of the gross weight of that particular container; for each of a batch of said containers, determining by said processing means a value representative of the net weight or volume of the contents based on the gross and tare weight values; calculating by said processing means, for said batch of containers, a value representative of average net weight or volume of the contents and, if necessary, applying a correction dependent on such value to the set point of the filling means established by the processing means, characterized by successively weighing a plurality of empty containers at a tare weighing station on said line upstream of the filling station, and for each of said containers storing in said processing means a value representative of the tare weight of that particular container, such values being output from a weighing means at said station; determining automatically, by means of said processing means and for each respective container, which stored tare weight value corresponds to each respective gross weight value so entered into the processing means, whereby the value representative of net weight or volume of the contents is calculated on the basis of the tare weight of each individual container; and operating the processing means to apply said correction to the set point if the average net weight or volume of the contents for said batch of containers differs from the said predetermined net weight or volume by more than a given amount; wherein the specific gravity of the fluid being filled into the containers is input to the processing means to allow the net volume of the contents of the containers to be calculated.

2. A method as claimed in claim 1 further characterized in that the operation of the processing means is such that the tare weight values of the containers move sequentially through a shift register, in synchronism with the movement of the containers along the filling line, whereby for each container at the gross weighing station the corresponding tare weight value is always at a predetermined position in said shift register and thereby can be determined for comparison with the respective gross weight value.

3. A method as claimed in claim 1 further characterized in that the processing means identifies containers which are to be rejected on the basis that their tare weights and/or the net weight or volume of their contents are outside predetermined limits, and such containers are subsequently rejected from the filling lines.

4. A method of filling a succession of containers moving along a plurality of filling lines, said lines leading to a discharge conveyor which receives containers in batches from discharge stations at the end of each said line, containers on each line being filled in accordance with a method as claimed in claim 3 characterized in that further processing means identifies for each batch to be discharged by said discharge conveyor which discharge station has a container thereon and thereby calculates the number of containers in the batch, and identifies from the processing means controlling the respective filling lines the positions of any containers in the batch which are to be rejected, the containers are counted along the discharge conveyor and those which have been identified as reject by the further processing means are removed from the conveyor.

5. A method of filling a succession of containers moving along a plurality of filling lines, said lines leading to a discharge conveyor which receives containers in batches from discharge stations at the end of each said line, comprising filling containers on each line with a predetermined net weight or volume of fluid by filling means located at a filling station on said line, by: establishing by means of a control processing means a set point for the filling means which is intended to deliver said predetermined weight or volume; entering into the control processing means tare weight data values in respect of the containers; successively moving said containers along said line to the filling station where they are filled by said filling means in accordance with said set point; successively moving said containers to a gross weighing station where they are weighed full, and for each of said containers entering into the processing means a value representative of the gross weight of that particular container; for each of a batch of said containers, determining by said processing means a value representative of the net weight or volume of the contents based on the gross and tare weight values; calculating by said processing means, for said batch of containers, a value representative of average net weight or volume of the contents and, if necessary, applying a correction dependent on such value to the set point of the filling means established by the processing means, characterized by successively weighing a plurality of empty containers at a tare weighing station on said line upstream of the filling station, and for each of said containers storing in said processing means a value representative of the tare weight of that particular containers, such values being output from a weighing means at said station; determining automatically, by means of said processing means and for each respective container, which stored tare weight value corresponds to each respective gross weight value so entered into the processing means, whereby the value representative of net weight or volume of the contents is calculated on the basis of the tare weight of each individual container; and the processing means operates to apply said correction to the set point if the average net weight or volume of the contents of said batch of containers differs from the said predetermined net weight by volume by more than a given amount; wherein the processing means identifies containers which are to be rejected on the basis that their tare weights and/or the net weight or volume of their contents are outside predetermined limits, and further processing means identifies for each batch to be discharged by said discharge conveyor which discharge station has a container thereon and thereby calculates the number of containers in the batch, and identifies from the processing means controlling the respective filling lines the positions of any containers in the batch which are to be rejected, the containers are counted along the discharge conveyor and those which have been identified as rejected by the further processing means are removed from the conveyor.

6. A method as claimed in claim 5 further characterized in that the containers are check weighed by a separate weighing device.

7. A method as claimed in claim 6 further characterized in that the number of containers in the batch is checked as it passes along the conveyor and if the number of containers in a batch is found to be incorrect, containers are rejected in that batch on the basis of the checkweight and not on the basis of the further processing means.

8. A method as claimed in claim 6 further characterized in that if the weight as checked indicates that a container is below a predetermined value, but the further processing means indicates that the container is not to be rejected, the remaining containers in the batch are rejected on the basis of the checkweight and not the further processing means.

9. A method of filling a succession of containers moving along a filling line with a predetermined net weight or volume of fluid by filling means located at a filling station on said line, comprising the steps of: establishing by means of a control processing means a set point for the filling means which is intended to deliver said predetermined weight or volume; entering into the control processing means tare weight data values in respect of the containers; successively moving said containers along said line to the filling station where they are filled by said filling means in accordance with said set point; successively moving said containers to a gross weighing station remote from said filling means where they are weighed full, and for each of said containers entering into the processing means a value representative of the gross weight of that particular container; for each of a batch of said containers, determining by said processing means a value representative of the net weight or volume of the contents based on the gross and tare weight values; calculating by said processing means, for said batch of containers, a value representative of average net weight or volume of the contents and, if necessary, applying a correction depending on such value to the set point of the filling means established by the processing means, characterized by successively weighing a plurality of empty containers at a tare weighing station on said line upstream of and remote from the filling means, and for each of said containers storing in said processing means a value representative of the tare weight of that particular container, such values being output from a weighing means at said station; determining automatically, by means of said processing means and for each respective container, which stored tare weight value corresponds to each respective gross weight value so entered into the processing means, whereby the value representative of net weight or volume of the contents is calculated on the basis of the tare weight of each individual container; and the processing means operates to apply said correction to the set point if the average net weight or volume of the contents for said batch of containers differs from the said predetermined net weight or volume by more than a given amount.

10. A method as claimed in claim 9 further characterized in that the operation of the processing means is such that the tare weight values of the containers move sequentially through a shift register, in synchronism with the movement of the containers along the filling line, whereby for each container at the gross weighing station the corresponding tare weight value is always at a predetermined position in said shift register and can thereby be determined for comparison with the respective gross weight value.

11. A method as claimed in claim 9 further characterized in that the processing means identifies containers which are to be rejected on the basis that their tare weights and/or the net weight or volume of their contents are outside predetermined limits, and such containers are subsequently rejected from the filling line.

12. A method of filling a succession of containers along a plurality of filling lines, said lines leading to a discharge conveyor which receives containers in batches from discharge stations at the end of each said line, containers on each line being filled in accordance with a method as claimed in claim 11, characterized in that further processing means identifies for easy batch to be discharged by said discharge conveyor which discharge station has a container thereon and thereby calculates the number of containers in the batch, and identifies from the processing means controlling the respective filling lines the positions of any containers in the batch which are to be rejected, the containers are counted along the discharge conveyor and those which have been identified as reject by the further processing means are removed from the conveyor.

13. Apparatus for filling a succession of containers moving along a filling line with a predetermined net weight or volume of fluid, comprising: a filling station located on said line; filling means located at said filling station; control processing means for establishing a set point for said filling means intended to deliver said predetermined weight or volume; means upstream of said filling station for inputting tare weight data values to said control processing means; a gross weighing station downstream of said filling station; means for successively moving said containers along said line to said gross weighing station through the filling station at which said containers are filled in accordance with the set point of said filling means; means at said gross weighing station for weighing said containers full and for providing an output value indicative of the gross weight of a particular container for input to said processing means; said processing means determining for each of a batch of containers a value representative of the net weight or volume of the contents based on the gross and tare weight values and for calculating for said batch of containers a value representative of the average net weight or volume of the contents and, if necessary, applying a correction dependent on such value to the set point of the filling means; characterized in that said means upstream of said filling station comprises weighing means for successively weighing said containers individually; in that for each container said processing means stores a value representative of the tare weight of that container, determines automatically for each respective container which stored tare weight value corresponds to each respective gross weight value entered thereinto and calculates a value representative of the net weight or volume of the contents based on the tare weight of each individual container; and in that the processing means operates to apply said correction to the set point if the average net weight or volume of the contents of said batch of containers differs from the said predetermined net weight or volume by more than a given amount; said apparatus further comprising means for inputting to the processing means the specific gravity of the fluid being filled into the containers to allow the volume of the contents to be calculated.

14. Apparatus as claimed in claim 13 further characterized in that the processing means is such that the stored tare weight values of the containers move sequentially through a shift register, in synchronism with the movement of the containers along the filling line, whereby for each container at the gross weighing station the corresponding tare weight value is always at a predetermined position in said shift register and can thereby be determined for comparison with the respective gross weight value.

15. Apparatus as claimed in claim 13 further characterized in that the processing means identifies containers whose tare weights and/or the net weight or volume of their contents are outside predetermined limits, and comprising means for removing such containers from the filling line.

16. Apparatus for filling a succession of containers comprising a plurality of filling lines in accordance with claim 15, further characterized by each of said filling lines comprising a discharge station at the end of the line, and by comprising a discharge conveyor for receiving containers from said discharge stations at the end of each line, said filling lines discharging containers onto said conveyor in a batch, and further processing means for identifying for each batch which lines have containers on their discharge stations to thereby calculate the number of containers in a batch, means for identifying from the processing means of the individual lines which containers to be discharged are to be rejected, means for counting the containers in the batch as it passes along the conveyor, and means for removing from the conveyor those containers identified as reject.

17. Apparatus for filling a succession of containers, comprising a plurality of filling lines for filling a succession of containers moving along each filling line with a predetermined net weight or volume of fluid, each said line comprising: a filling station located on said line; filling means located at said filling station; control processing means for establishing a set point for said filling means intended to deliver said predetermined weight or volume; means upstream of said filling station for inputting tare weight data values to said control processing means; a gross weighing station downstream of said filling station; means for successively moving said containers along said line to said gross weighing station through the filling station at which said containers are filled in accordance with the set point of said filling means; means at said gross weighing station for weighing said containers full and for providing an output value indicative of the gross weight of a particular container for input to said processing means; said processing means determining for each of a batch of containers a value representative of the net weight or volume of the contents based on the gross and tare weight values and calculating for said batch of containers a value representative of the average net weight or volume of the contents and, if necessary, applying a correction dependent on such value to the set point of the filling means; characterized in that said means upstream of said filling station comprises weighing means for successively weighing said containers individually; in that for each container said processing means stores a value representative of the tare weight of that container, determines automatically for each respective container which stored tare weight value corresponds to each respective gross weight value entered thereinto and calculates a value representative of the net weight or volume of the contents based on the tare weight of each individual container; and in that the processing means operates to apply said correction to the set point if the average net weight or volume of the contents for said batch of containers differs from the said predetermined net weight or volume by more than a given amount; wherein the processing means identifies containers whose tare weights and/or the net weight or volume of their contents are outside predetermined limits, each of said filling lines comprises a discharge station at the end of the line, and said apparatus further comprises a discharge conveyor for receiving containers from said discharge stations at the end of each line, said filling lines discharging containers onto said conveyor in a batch, and further processing means for identifying for each batch which lines have containers on their discharge stations to thereby calculate the number of containers in a batch, means for identifying from the processing means of the individual lines which containers to be discharged are to be rejected, means for counting the containers in the batch as it passes along the conveyor, and means for removing from the conveyor those containers identified as reject.

18. Apparatus as claimed in claim 17 further characterized by comprising a check weighing device arranged in the discharge conveyor.

19. Apparatus as claimed in claim 18 further characterized by comprising means for checking the number of containers in a batch as it passes along the conveyor, and if the number is found to be incorrect, means for rejecting containers in that batch on the basis of the checkweighing device and not the further processing means.

20. Apparatus as claimed in claim 18 further characterized by comprising means for detecting the condition in which both the weight of a container as determined by the checkweighing device is below a predetermined value, and the further processing means indicates that the container is not to be rejected, and means for rejecting the remaining containers in that batch on the basis of the checkweighing device rather than the further processing means when such a condition is detected.

21. Apparatus for filling a succession of containers moving along a filling line with a predetermined net weight or volume of fluid, comprising: a filling station located on said line; filling means located at said filling station; control processing means for establishing a set point for said filling means intended to deliver said predetermined weight or volume; means upstream of and remote from said filling means for inputting tare weight data values to said control processing means; a gross weighing station downstream of and remote from said filling means; means for successively moving said containers along said line to a gross weighing station through the filling station at which said containers are filled in accordance with the set point of said filling means, means at said gross weighing station for weighing said containers full and for providing an output value indicative of the gross weight of a particular container for input to said processing means; said processing means determining for each of a batch of containers a value representative of the net weight or volume of the contents based on the gross and tare weight values and calculating for said batch of containers a value representative of the average net weight or volume of the contents and, if necessary, applying a correction dependent on such value to the set point of the filling means, characterized in that said means upstream of said filling means comprises weighing means for successively weighing said containers individually; in that for each container said processing means stores a value representative of the tare weight of that container, determines automatically for each respective container which stored tare weight value corresponds to each respective gross weight value entered thereinto and calculates a value representative of the net weight or volume of the contents based on the tare weight of each individual container; and in that the processing means operates to apply said correction to the set point if the average net weight or volume of the contents for said batch of containers differs from the said predetermined net weight or volume by more than a given amount.

22. Apparatus as claimed in claim 21 further characterized in that the processing means is such that the stored tare weight values of the containers move sequentially through a shift register, in synchronism with the movement of the containers along the filling line, whereby for each container at the gross weighing station the corresponding tare weight value is always at a predetermined position in said shift register and can thereby be determined for comparison with the respective gross weight value.

23. Apparatus as claimed in claim 21 further characterized in that the processing means identifies containers whose tare weights and/or the net weight or volume of their contents are outside predetermined limits, and comprising means for removing such containers from the filling line.

24. Apparatus for filling a succession of containers comprising a plurality of filling lines in accordance with claim 23, further characterized by each of said filling lines comprising a discharge station at the end of the line and by comprising a discharge conveyor for receiving containers from said discharge stations at the end of each said line, said filling lines discharging containers onto said conveyor in a batch, and further processing means for identifying for each batch which lines have containers on their discharge stations to thereby calculate the number of containers in a batch, means for identifying from the processing means of the individual lines which containers to be discharged are to be rejected, means for counting the containers in the batch are to be rejected, means for counting the containers in the batch as it passes along the conveyor, and means for removing from the conveyor those containers identified as reject.

25. A method of filling a succession of containers moving along a filling line with a predetermined net weight or volume of fluid by filling means located at a filling station on said line, comprising the steps of: establishing by means of a control processing means a set point for the filling means which is intended to deliver said predetermined weight or volume; entering into the control processing means tare weight data values in respect of the containers; successively moving said containers along said line to the filling station where they are filled by said filling means in accordance with said set point; successively moving said containers to a gross weighing station where they are weighed full, and for each of said containers entering into the processing means a value representative of the gross weight of that particular container; for each of a batch of said containers, determining by said processing means a value representative of the net weight or volume of the contents based on the gross and tare weight values; calculating by said processing means, for said batch of container, a value representative of average net weight or volume of the contents and, if necessary, applying a correction dependent on such value to the set point of the filling means established by the processing means, characterized by successively weighing a plurality of empty containers at a tare weighing station on said line upstream of the filling station, and for each of said containers storing in said processing means a value representative of the tare weight of that particular container, such values being output from a weighing means at said station; determining automatically, by means of said processing means and for each respective container, which stored tare weight value corresponds to each respective gross weight value so entered into the processing means, whereby the value representative of net weight or volume of the contents is calculated on the basis of the tare weight of each individual container; and operating the processing means to apply said correction to the set point if the average net weight or volume of the contents for said batch of containers differs from the said predetermined net weight or volume by more than a given amount; wherein the operation of the processing means is such that the tare weight values of the containers move sequentially through a shift register, in synchronism with the movement of the containers along the filling line whereby for each container at the gross weighing station the corresponding tare weight value is always at a predetermined position in said shift register and can thereby be determined for comparison with the respective gross weight value.

* * * * *